(12) United States Patent
Kaulio

(10) Patent No.: US 7,855,900 B2
(45) Date of Patent: Dec. 21, 2010

(54) METHOD AND ARRANGEMENT IN CONNECTION WITH HALF-CONTROLLED NETWORK BRIDGE

(75) Inventor: Alpo Kaulio, Helsinki (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 12/397,089

(22) Filed: Mar. 3, 2009

(65) Prior Publication Data

US 2010/0226153 A1 Sep. 9, 2010

(51) Int. Cl.
*H02M 5/458* (2006.01)
*H02H 7/125* (2006.01)
*H02M 5/45* (2006.01)

(52) U.S. Cl. .............................. 363/37; 363/54; 363/57

(58) Field of Classification Search ................... 363/54, 363/57, 85, 96, 128, 160, 169, 135, 136
See application file for complete search history.

(56) References Cited

U.S. PATENT DOCUMENTS

| | | | |
|---|---|---|---|
| 4,545,002 A | * | 10/1985 | Walker ........................ 363/37 |
| 6,038,155 A | * | 3/2000 | Pelly ........................... 363/129 |
| 7,388,765 B2 | | 6/2008 | Kaulio |
| 2002/0044004 A1 | | 4/2002 | Guido, Jr. et al. |
| 2004/0090260 A1 | * | 5/2004 | Peron .......................... 327/465 |
| 2006/0043412 A1 | * | 3/2006 | Kaulio ......................... 257/139 |
| 2008/0074910 A1 | * | 3/2008 | Casteel et al. ................. 363/54 |

* cited by examiner

*Primary Examiner*—Adolf Berhane
*Assistant Examiner*—Emily Pham
(74) *Attorney, Agent, or Firm*—Buchanan Ingersoll & Rooney PC

(57) ABSTRACT

A method and an arrangement are provided for controlling phase-specific thyristors of a half-controlled network bridge. The method includes identifying continuously a thyristor to be controlled on the basis of magnitudes of supplying phase voltages, controlling the thyristor by enabling a current flow to its gate current circuit through an inductive component of a constant current regulator, which is common to all the gate current circuits. The thyristor control includes determining a magnitude of the gate current at the potential of the gate conductor in the constant current regulator, alternately switching off the voltage producing the gate current from the gate current circuit when the gate current is higher than a first predetermined limit, and switching on the voltage producing the gate current in the gate current circuit when the gate current is lower than a second predetermined limit.

14 Claims, 3 Drawing Sheets

METHOD AND ARRANGEMENT IN CONNECTION WITH HALF-CONTROLLED NETWORK BRIDGE

BACKGROUND OF THE INVENTION

The invention relates to a method and arrangement in connection with a half-controlled network bridge. More specifically, the invention relates to a method and arrangement for controlling thyristors of a half-controlled network bridge.

A network bridge is an electric converter for converting ac voltage of a network to dc voltage. A network bridge in its simplest form has six diodes, with two diodes connected in series for each network phase. These series-connected diodes are further connected in parallel with each other. Network phases are connected between the series-connected diodes, the anodes and cathodes of the parallel-connected pairs forming a positive and a negative terminal for dc voltage. This type of connection can be used for generating a 6-pulse voltage, the magnitude of which cannot be changed.

Half-controlled network bridges are commonly used in connection with frequency converters provided with intermediate DC circuits for generating the dc voltage of the intermediate circuit. The magnitude of the voltage generated by a half-controlled network bridge can be controlled by using controllable switches of the bridge. FIG. 1 illustrates an example of a half-controlled network bridge composed of three diodes and three thyristors. Each connected diode and thyristor forms a series-connected pair in which the cathodes of the diodes are connected to the anodes of the thyristors. Further, all pairs thus connected are further connected in parallel and the network voltage phases are connectable between the series-connected components. A rectified voltage Udc is formed between the cathodes of the thyristors and the anodes of the diodes.

A thyristor is known to be a component that can be switched on to a conductive state by supplying gate current to the gate, when the thyristor voltage is forward-biased. However, a conventional thyristor cannot be switched off from the gate, but the thyristor remains conductive for as long as there is current passing through it. The operation of thyristors in connection with a network rectifier of a frequency converter is important for generating the desired intermediate circuit dc voltage. Therefore, to ensure that thyristors turn on, they are not only supplied with a single gate current pulse sufficient for turn-on, but also receive continuous current feed for as long as turn-on is possible.

Prior art teaches gate control achieved by connecting the gate to a voltage, the gate current provided by which being restricted by using resistive coupling. To reduce power consumption, voltage is switched to the gate, thus producing a pulsed gate current. A typical example of a prior art implementation is to produce a pulsed gate current at a predetermined switching frequency. An example of this kind of constant switching frequency is 30 kHz, with a current amplitude of 0.5 A and pulse rate of about 55/45. Each cycle thus has 20 µs of current-carrying time and about 16 µs dead time. However, the gate current generated this way involves considerable power consumption, because the magnitude of the current is restricted by a resistor.

In the prior art method, the gate current depends on the voltage connected to the gate, on the resistances on the current path and on the voltage drops. Consequently, the magnitude of the current may vary significantly due to variations in the supply voltage and in the gate-cathode voltage of the thyristor to be controlled. In the worst case, the current is not sufficient for turning on the thyristor as desired.

Moreover, continuous switching of the gate current circuit may cause problems relating to electromagnetic disturbances due to high switching-off rates of the gate current.

US 2002/0044004 A1 proposes a solution in which a continuous gate current is delivered to turn on a thyristor. However, the solution is complicated when used for controlling thyristors in a half-controlled thyristor bridge.

U.S. Pat. No. 7,388,765 B2 discloses a method in which a continuous current is used to turn on the thyristors. This continuous current is further obtained from a voltage source that is common to all gate driver circuits. The problem with the method disclosed in U.S. Pat. No. 7,388,765 relates to the large number of components for carrying out the required operations.

BRIEF DESCRIPTION OF THE INVENTION

It is an object of the invention to provide a method and an arrangement that avoid the above drawbacks and enable thyristors of a half-controlled thyristor bridge to be controlled more economically and with fewer components. This is achieved by a method and an arrangement of the invention characterized by what is stated in the independent claims. Preferred embodiments of the invention are disclosed in the dependent claims.

The invention is based on the idea of controlling thyristors of a half-controlled network bridge by means of a continuous gate current provided with a common circuitry for all gate current circuits.

The method and arrangement of the invention provide a gate current whose magnitude of which can be precisely determined and thus made ideal for turning on a thyristor. In addition, the gate current is independent of any changes in the auxiliary voltage supplying the gate current. The gate current is taken through an inductive component, thereby restricting the rate of current rise. Further, in the present invention only one current source is used. The current from this source is switched to the thyristor needing a gate current on the basis of the phase voltages.

BRIEF DESCRIPTION OF THE DRAWINGS

In the following the invention will be described in greater detail with reference to the preferred embodiments and the accompanying drawings, in which.

DETAILED DESCRIPTION OF THE INVENTION

Figure 2:
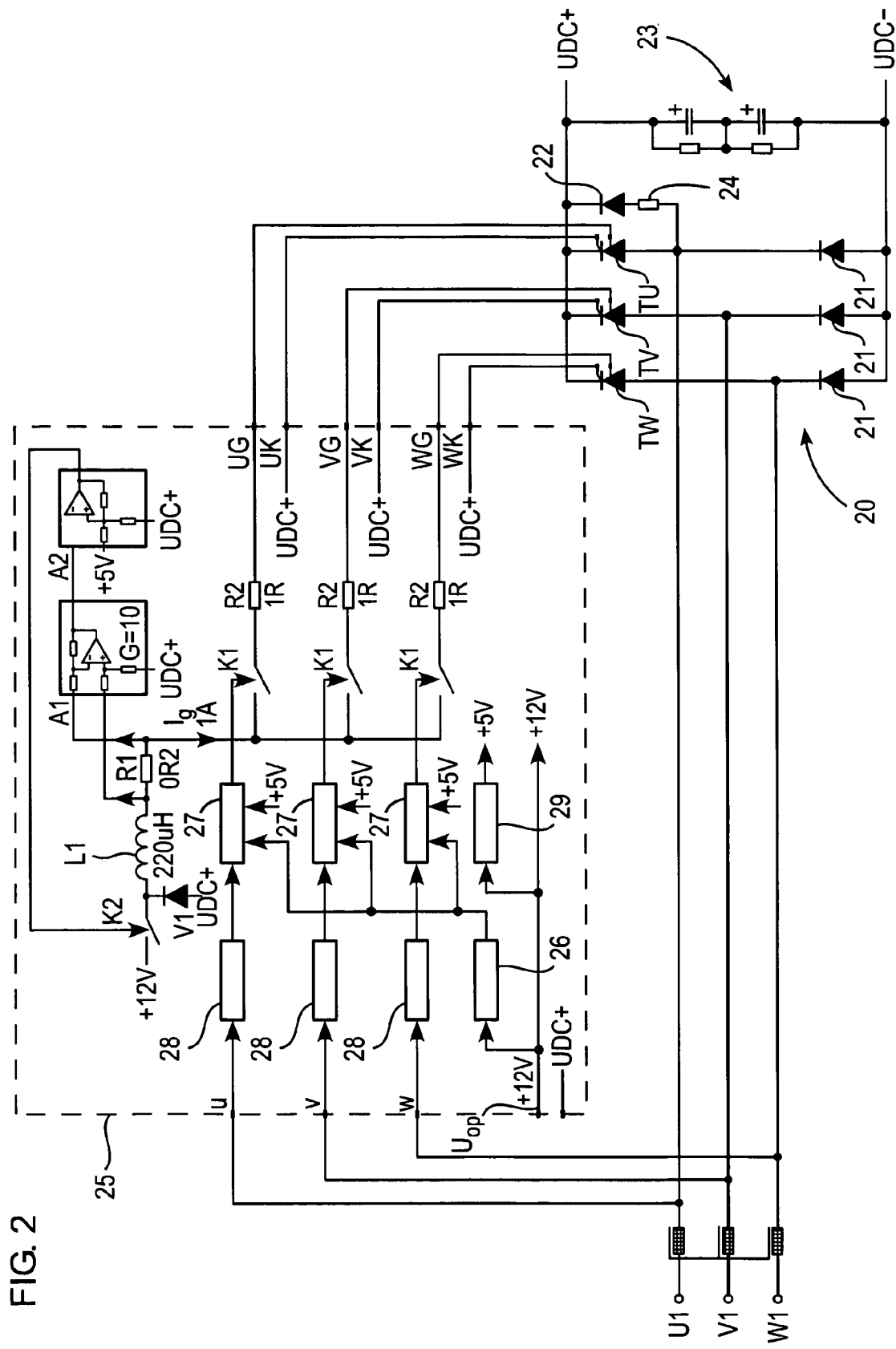
FIG. 2 is a block diagram of an arrangement of the invention.

FIG. 2 is a schematic view of a three-phase half-controlled network bridge in connection with a frequency converter provided with an intermediate voltage circuit and a control circuit of the invention. The supply network voltage is to be connected to connectors U1, V1 and W1 and then rectified by means of a rectifier bridge 20 to provide a dc voltage to an intermediate dc voltage circuit UDC+, UDC−. The intermediate circuit is provided with capacitors 23, connected in a known manner, and balancing resistors connected in parallel with them. FIG. 2 also shows an intermediate circuit charging diode 22 and a series resistor 24 thereof. A discharged intermediate circuit is first charged with a phase U of network voltage through a circuit formed by the diode and the resistor.

The object of the arrangement and method of the invention is to control thyristors TW, TV, TU of the half-controlled network bridge to generate a voltage to an intermediate circuit. The thyristors are controlled by a control circuitry 25 whose inputs consist of phase voltages U, V, W, rectified voltage UDC+, and operating voltage $U_{op}$, the value of which is 12 V in the drawings. FIG. 2 also shows how the operating voltage is used to generate an auxiliary voltage of 5 volts by means of a regulator 29.

The thyristor control begins when the voltage in the intermediate circuit rises sufficiently close to its target value. The rising of voltage is determined outside FIG. 2, an achieved target value being indicated to the circuitry by connecting the operating voltage $U_{op}$ thereto.

Once the operating voltage is connected to the circuitry, a turn-on block 26 transmits a signal enabling control to be carried out to control logics 27 of the different phases. The control logics 27 receive as inputs also phase voltage information from attenuator blocks 28. The attenuator blocks consist of resistances, for example, used for modifying a phase voltage signal so that the control logics can be used for selecting the thyristor to be controlled in each particular case. In other words, in each phase the control logic independently decides whether a thyristor associated with the phase in question can be controlled. The phase to be controlled may be selected for example by comparing the outputs of the attenuator blocks with a known voltage. When the attenuator block voltage exceeds a predetermined limit, the control of the thyristor of the phase associated with the attenuator block concerned begins and, correspondingly, ends when the voltage drops below the limit. The reference voltage may be common to all phases, for example, and generated by using an auxiliary voltage obtained from the regulator 29. The comparison between the phase voltage and the reference voltage may be implemented by means of a simple operational amplifier comparison.

After the thyristor to be controlled is identified, the control logic controls a switch K1 of the respective phase conductive. The arrangement of the invention comprises a constant current regulator that is common to all the phases and gate current circuits. The current from this constant current regulator is thus controlled to a correct gate current circuit and thyristor by operating the switches K1 with the control logic as mentioned above.

The constant current regulator of the invention produces a current from a voltage source which is, for example, the auxiliary power supply. In FIG. 2, the voltage is indicated to be +12V, i.e. 12 volts above the voltage of the DC+ bus. Gate current $I_g$ flows in the constant current regulator through an inductive component L1 and resistive component R1. The inductive component restricts the rise time of the current and the resistive component is used for determining the value of the current. The value of the current is determined from a voltage drop in the resistance and the measurement is carried out in differential manner.

For the purpose of determining the current, a differential amplifier A1 is connected to the terminals of the resistive component R1. The output of the differential amplifier is connected to a comparator circuit A2, which is set to compare the gate current with limit values. The upper and lower limit values for current determine a range between which the gate current oscillates. Once the current reaches the upper limit, the output of the comparator A2 controls a switch K2 to an open position and thereby the current flowing from the constant current regulator starts to fall when the energy stored in the inductive component is discharged. Again, when the current drops to a lower limit value, the comparator closes the switch and the voltage source is connected back to circuit and thereby the current starts increasing again.

As mentioned above, the constant current regulator is common to all gate circuits. Once the constant current regulator starts operating, the current from it is switched to the gate circuit of the thyristor that should conduct. Thus the current is switched to different gate circuits using switches K1 independently of the operation of the constant current regulator.

When, for example, the control logic circuits 27 determine that the voltage of phase U is higher than the other phase voltages, current from the constant current regulator flows to the gate circuit of thyristor TU from the control circuitry 25. The current path includes switch K1, resistive component R2 and the gate of thyristor TU, after which the current returns via an auxiliary cathode to zero potential of the auxiliary voltage, i.e. reference potential UDC+ of the control circuitry 25. As mentioned, this reference potential is the potential of the positive voltage bus. Since all the cathodes are connected rigidly together, the current can, in fact, return via any of the return conductors to the points UK, VK or WK in the control circuitry 25. If the active switch K2 of the constant current regulator is in open state, i.e. not conducting, the current eventually returns to the constant current regulator via a diode V1.

As the control logic 27 detects the drop in the phase voltage, the switch K1 in question is opened and at the same time the gate current is controlled to another gate circuit using the switch relating to the phase voltage that has risen to have the highest phase voltage and thus to a thyristor that has been forward biased.

Preferably, the gate current produced from the constant current regulator is led to the thyristor a small time period prior to the first possible turn-on instant. This is due to the fact that thyristors are controlled to behave like diodes and to ensure that the thyristors are actually conducting from the first possible turn-on instant. In view of the above, current from the constant current regulator is led to two gate circuits simultaneously during the commutation of the thyristors. This is taken into account in the invention by placing resistors R2 onto the gate current paths and by making the amplitude of the gate current such that it is enough for two thyristors. The resistors R2 help to divide the current produced by the constant current regulator equally between simultaneously active gate current paths. The ohmic value of the resistive components R2 can be relatively small, for example 1 Ohm.

Since the current from the constant current regulator is shared by two gate circuits, the amplitude of the current has to be at least such that it is sufficient for two thyristors. If one thyristor requires 0.5 A for reliable turn-on, the amplitude of the current generated by the constant current regulator should be at least 1 A. As is known, the thyristors turn off by themselves when the current through them drops to zero. When the thyristors are not forward-biased, it is not wise to give any gate current to them. Therefore the gate current is stopped by opening the switch K1 when the thyristor is reverse-biased.

The control logic circuits 27 have an internal voltage limit to which the phase voltage information from the attenuators is compared with. This voltage limit can be set in such a way that the control logic circuits turn the respective switches K1 on at a desired instant when the phase voltage is still below the voltage of the intermediate circuit UDC+. Similarly, the control logic circuits can be set to open the switch when the phase voltage is at a desired level. Typically, the gate current is switched off from a thyristor when it becomes reverse-biased, i.e. the voltage of the respective phase falls below the voltage of the positive rail UDC+.

The control circuitry of FIG. 2 comprises connecting points for the thyristor gates UG, VG, WG and auxiliary cathodes UK, VK, WK that connect the thyristors to the control circuitry.

FIG. 2 shows, by way of example, electric values of components. The value given to the resistive component R1 is 0.2 Ohm and the inductance of the inductive component L1 is 220 µH.

Figure 1:
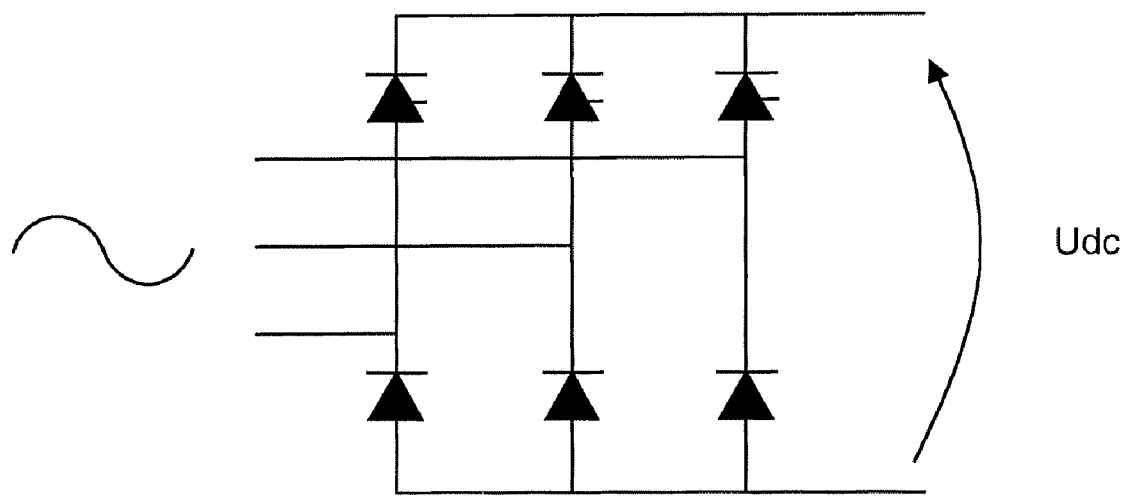
FIG. 1 shows a half-controlled network bridge.
Figure 3:
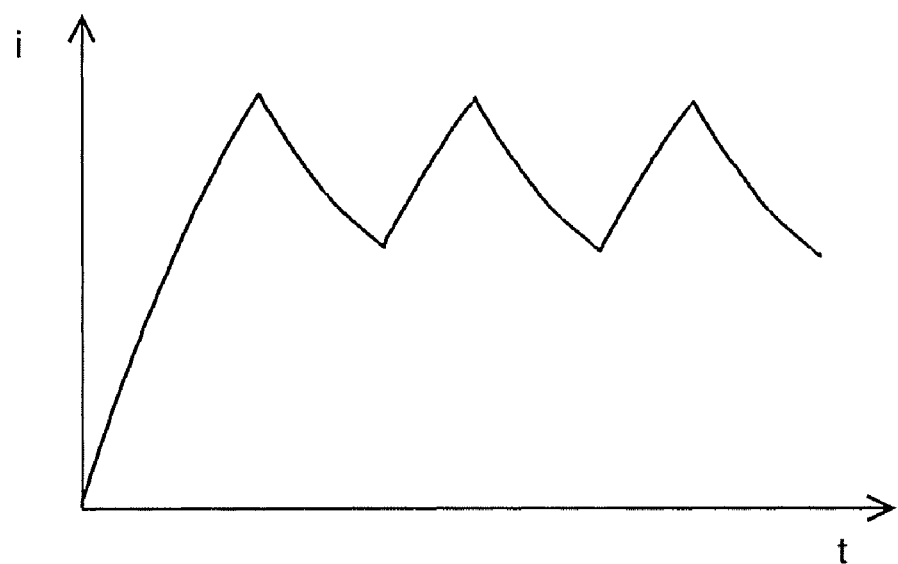
FIG. 3 shows a curve of a current provided by a constant current regulator of the invention.

The method and arrangement of the invention provide a continuous gate current of a specific waveform. FIG. 3 is a curve showing the form of the gate current obtained by means of the invention. The frequency of the curve form and the shape of the wave may be modified by means of the hysteresis resistor of the operational amplifier circuit acting as the comparator. When the method of the invention is being applied, a typical range of the switching frequency is about 10 to 40 kHz. The figure shows the increase of the gate current from zero at the start of the thyristor control and the ensuing curve form for a few cycles.

Figure 4:
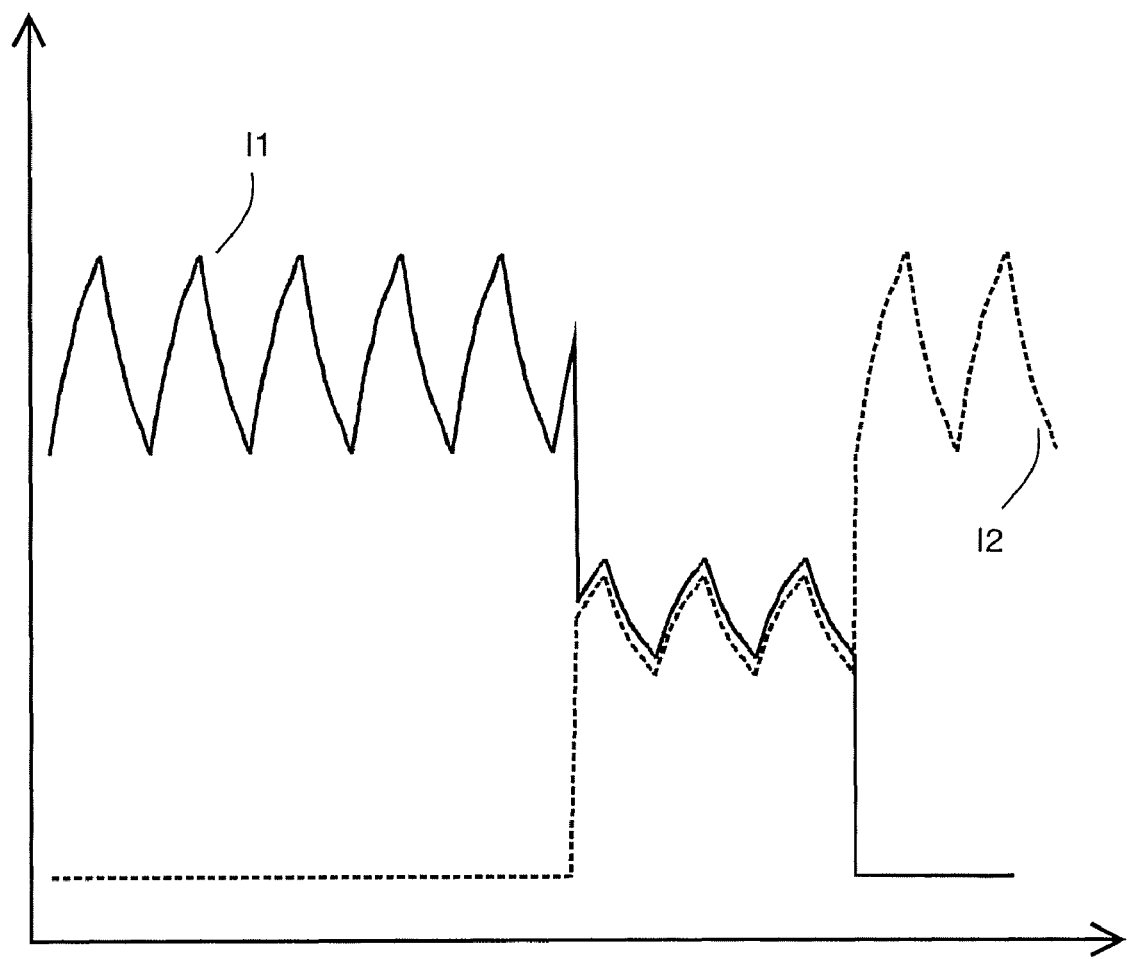
FIG. 4 shows current waveforms when current is changed from one gate circuit to another.

FIG. 4 shows a current waveform of two gate circuits when the current is changed from one gate circuit to another. It is to be noted that the waveforms are shown for illustrative purposes, and that the amplitudes of the currents do not necessarily represent any actual case. In FIG. 4 it can be seen that when a current I2 is controlled to a gate of a thyristor to be turned on, a current I1 is still flowing to a forward-biased other thyristor circuit. This causes a drop in the amplitude of the current I1. As the current I1 is blocked from the respective gate circuit, the amplitude of the current I2 rises and stays at that level until it is the turn of another phase to conduct. The sum of the currents I1 and I2 is the current leaving the constant current regulator.

It is apparent to a person skilled in the art that the basic idea of the invention can be implemented in various ways. The invention and its embodiments are therefore not restricted to the above examples, but may vary within the scope of the claims.

The invention claimed is:

1. A method of controlling phase-specific thyristors of a half-controlled network bridge, each thyristor respectively having a corresponding gate current circuit and a corresponding phase voltage being supplied to the corresponding thyristor, the method comprising:
   identifying a thyristor to be controlled among the thyristors on the basis of magnitudes of the phase voltages; and
   controlling the identified thyristor by enabling a gate current to flow to the gate current circuit of the identified thyristor through an inductive component of a constant current regulator, the constant current regulator being configured to apply the gate current to all the gate current circuits of the thyristors, the gate current being produced by a voltage source,
   wherein the controlling of the identified thyristor comprises:
      determining a magnitude of the gate current based on a potential of a conductor in the constant current regulator through which the gate current passes; and
      alternately switching off the voltage source producing the gate current in the gate current circuit when the magnitude of the gate current is higher than a first predetermined limit, and switching on the voltage source producing the gate current when the magnitude of the gate current is lower than a second predetermined limit.

2. A method according to claim 1, wherein the identifying of the thyristor to be controlled comprises:
   detecting whether the phase voltage supplied to one of the thyristors rises above a third predetermined limit; and
   turning on the one of the thyristors to which the detected phase voltage is supplied.

3. A method according to claim 1, wherein the method comprises:
   detecting whether the identified thyristor is reversed biased by determining whether the phase voltage supplied to the identified thyristor drops below a third predetermined limit; and
   disabling the gate current flow to the gate circuit of the identified thyristor in response to the drop in the phase voltage supplied to the identified thyristor.

4. A method according to claim 1, wherein the method comprises:
   applying the gate current from the constant current regulator to the corresponding gate current circuit of at least one of the thyristors prior to the at least one of the thyristors being supplied with the respective phase voltage.

5. An arrangement for controlling phase-specific thyristors of a network bridge, the arrangement comprising:
   phase-specific thyristors arranged in a network bridge, each thyristor being configured to be supplied with a respective phase voltage; and
   a constant current regulator circuit comprising:
      an inductive component;
      a voltage source configured to produce a gate current that flows through the inductive component;
      means for determining a magnitude of the gate current;
      means for identifying a thyristor among the thyristors to be controlled on the basis of magnitudes of the phase voltages; and
      means for alternately switching off the voltage source configured to produce the gate current when the magnitude of the gate current is higher than a first predetermined limit, and switching on the voltage source configured to produce the gate current when the magnitude of the gate current is lower than a second predetermined limit,
   wherein the arrangement further comprises means for applying the gate current produced by the constant current regulator to the identified thyristor and at least one other thyristor among the phase-specific thyristors.

6. An arrangement according to claim 5, wherein the means for determining the magnitude of the gate current comprises:
   a resistive component arranged in the constant current regulator; and
   a member configured to determine a voltage across the resistive component.

7. An arrangement according to claim 6, wherein the means for alternately switching the voltage source comprises:
   a comparator member responsive to the member determining the voltage across the resistive component; and
   a controllable switch member responsive to the comparator member for switching on and off the voltage source configured to produce the gate current.

8. An arrangement according to claim 6, wherein the member configured to determine the voltage across the resistive component is an operational amplifier circuit acting as a differential amplifier.

9. An arrangement according to claim 7, wherein the comparator member is an operational amplifier circuit acting as a comparator provided with hysteresis.

10. An arrangement according to claim 5, wherein the means for applying the gate current produced by the constant current regulator comprises a plurality of gate current circuits, each of the gate current circuits respectively comprising a resistive component which is configured to balance the gate current flowing therethrough and which is connected in series with a gate of a corresponding one of the thyristors.

11. An arrangement according to claim 7, wherein the member configured to determine the voltage across the resistive component is an operational amplifier circuit acting as a differential amplifier.

12. An arrangement according to claim 11, wherein the comparator member is an operational amplifier circuit acting as a comparator provided with hysteresis.

13. An arrangement according to claim 6, wherein the means for applying the gate current produced by the constant current regulator comprises a plurality of gate current circuits, each of the gate current circuits respectively comprising a resistive component which is configured to balance the gate current flowing therethrough and which is connected in series with a gate of a corresponding one of the thyristors.

14. An arrangement for controlling phase-specific thyristors of a network bridge, the arrangement comprising:

phase-specific thyristors arranged in a network bridge, each thyristor being configured to be supplied with a respective phase voltage; and a constant current regulator circuit comprising:
   an inductive component;
   a voltage source configured to produce a gate current that flows through the inductive component;
   a plurality of first switches each connected to a corresponding one of the phase-specific thyristors, the first switches each being configured to couple the gate current produced by the voltage source to the corresponding one of the phase-specific thyristors when the phase voltage respectively supplied to the corresponding one of the phase specific thyristors exceeds a first predetermined limit; and
   a second switch configured to turn the gate current off when the magnitude of the gate current is higher than a second predetermined limit, and configured to switch the gate current on when the magnitude of the gate current is lower than a third predetermined limit.

\* \* \* \* \*